Figure 1:
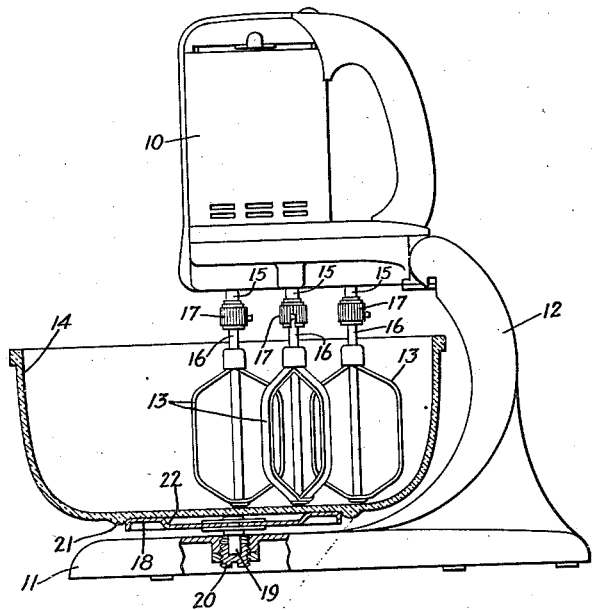

March 5, 1940.   R. F. BEAN   2,192,843
FOOD-WORKING DEVICE
Filed Sept. 28, 1937

Inventor:
Robert F. Bean,
by Harry E. Dunham
His Attorney.

Patented Mar. 5, 1940

2,192,843

UNITED STATES PATENT OFFICE.

2,192,843

FOOD-WORKING DEVICE

Robert F. Bean, Bridgeport, Conn., assignor to General Electric Company, a corporation of New York Application September 28, 1937, Serial No. 166,063

3 Claims. (Cl. 259—84)

This invention relates to food-working devices, more particularly to power driven food-working devices used for mixing batters, beating eggs, whipping cream, etc., and it has for its object the provision of an improved device of this character.

More particularly, this invention relates to a food-working device that is provided with a plurality of interchangeable mixer bowls of different diameters, and also suitable beater or agitator means for operating in the bowls.

This invention contemplates the provision of an improved food-working device of this character embodying suitable means for effecting proper operating relationship between the agitating or beater means and the walls of each of the mixing bowls, irrespective of which of the bowls is being used.

More specifically, this invention contemplates the provision of a food working device having a common support for all of the bowls rotatable on a fixed axis, and arranged to support each of the interchangeable bowls for rotation on this axis. It further contemplates the provision of means for driving a beater or agitator element in each of a plurality of axes located at different positions with reference to the axis of rotation of the bowl support so that the beater element will have substantially the same cooperative relationship with the side walls of each of the bowls, irrespective of which of the bowls is mounted on the bowl support.

In accordance with this invention, the food-working device is provided with suitable beater driving shafts rotatable on fixed axes located at different positions radially with reference to the fixed axis upon which the beater support rotates. A beater element is arranged to be driven selectively by the driving shafts whereby it has substantially the same cooperative relationship with the side wall of each bowl mounted on the bowl support, irrespective of which of the bowls of different diameter is used.

In one specific form of my invention wherein two bowls are used, one having a large diameter and the other a small diameter, I use a plurality of beater elements for operation in the two bowls, and selectively operate them by the driving shafts so that a beater element always is located properly with reference to the walls of the bowls. Here, I prefer to use three beaters in the large bowl, and when the small bowl is substituted for the large bowl, I merely remove one of the three beater elements so that at least one of the remaining two beater elements is closely related to the side wall of the small bowl in the same manner that the third beater element removed had with the large bowl.

Figure 2:
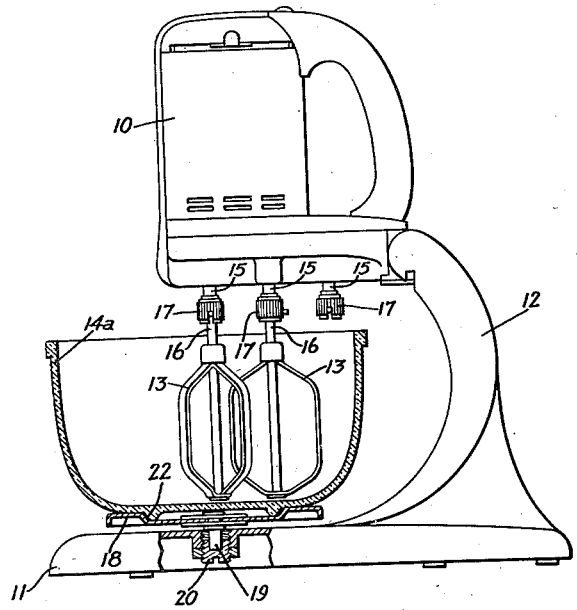

For a more complete understanding of this invention, reference should be had to the accompanying drawing in which Fig. 1 is a side elevation of a food working device embodying this invention, parts being shown in section so as to illustrate certain details of construction; and Fig. 2 is a view similar to Fig. 1 but illustrating a bowl of different diameter on the rotatable bowl support.

Referring to the drawing, this invention has been shown in one form as applied to a power operated food-working device such as used in hoesehold kitchens and the like and comprising a power unit 10 mounted upon a base 11. The base 11 as shown, has at one end, its right-hand end as viewed in the figures, an upright curved standard 12. The power unit 10 is arranged to be supported on the standard 12 so that it overhangs the base 11 for operating beater elements 13 in a mixing bowl 14 for mixing, whipping and like food-working operations.

A hinge structure is provided for connecting the power unit 10 to the standard in its position shown in the drawing, wherein it is in a working position to operate the beaters 13 in the bowl 14, and providing for pivotal movement of the power unit from this position to a second position (not shown) wherein it removes the beaters from the mixing bowl. This hinge structure preferably will be arranged as described and claimed in my copending application, Serial No. 228,971, filed September 8, 1938, which application is a division of the instant application.

The power unit 10 is constructed and arranged to drive on fixed axes a plurality of food-working shafts or spindles 15 arranged generally vertically and in parallel spaced-apart relation, as clearly shown in the drawing; as here shown, there are three of these shafts provided. These shafts operate on axes lying in a common plane. The beaters 13 are provided with supporting shafts 16 which are adapted to be coupled to and driven by the shafts 15. The shafts 16 are detachably secured to the shafts 15 by coupling members 17 which preferably will be arranged in accordance with the coupling means described and claimed in my copending application, Serial No. 228,972, filed September 8, 1938, which application is a division of the instant application.

As pointed out previously, it is contemplated that a plurality of interchangeable bowls of relatively small and large diameters will be provided. In Fig. 1, there is shown a large bowl 14 and in Fig. 2 a relatively smaller bowl 14a. A single turn table 18 is provided for supporting these bowls. The turn table 18 is mounted to rotate on a fixed axis in the base 11 by means of a shaft 19 which is received in an adjustable spindle 20 mounted in the base 11. In other words, the turn table 18 supports the different sized bowls for rotation on a common fixed axis. The bowl 14 of the larger diameter has an annular bead 21 under its bottom wall which cooperates with the outer rim of the turn table so as to center the large bowl, while the turn table is provided with a seat 22 which centers the smaller bowl 14a.

The fixed axis of rotation of the turn table is so related to the fixed axis of two driving shafts 15 that a beater element may be operated in substantially the same cooperative relationship with the side wall of each of the bowls, irrespective of which is mounted on the turn table so as to tend to rotate the bowl by the reaction of the beater on the material in the bowl when the beater is operated. As shown in Fig. 1, the right-hand inside beater element 13 is operated in substantially the same relationship with the side wall of the large bowl 14 as has the right-hand beater element 13, now driven by the central shaft 15, with the side wall of the small bowl 14a when this smaller bowl is substituted for the large bowl, as shown in Fig. 2. It will be observed, therefore, that the right-hand beater element 13 of Fig. 1 may be operated in the same cooperative relationship with the side wall of each of the bowls when one bowl is substituted for the other merely by shifting it between the central and the inside right-hand drive shafts 15; to repeat, if the small bowl is substituted for the large bowl, the beater element is merely moved from the inner right-hand drive shaft 15 of Fig. 1 to the central shaft 15, as shown in Fig. 2; if the large bowl be replaced the right-hand beater of Fig. 2 (now driven by the central drive shaft 15) is merely shifted from the central drive shaft to the inner right-hand drive shaft, as shown in Fig. 1. In each case, the beater element occupies the proper position with relation to the walls of the bowls so that it tends to rotate the bowl by its action on the material in the bowl.

Generally, however, it is desirable to use at least two beater elements in each of the bowls. In this case, when employing the large bowl 14, the two beaters will be driven by the central and the inner right-hand drive shafts 15, leaving the left-hand outside drive shaft idle. When substituting the small bowl for the large, the inside beater 13 may be shifted to the outside left-hand drive shaft leaving the inner right-hand drive shaft idle, as shown in Fig. 2; here the central drive shaft 15 becomes the inner right-hand drive shaft for the small bowl. Thus, when two beater elements are used, it is merely necessary to shift one of the beater elements from one outside drive shaft to the other when substituting one bowl for the other.

In order to provide a much better whipping and mixing action, I prefer to use three beater elements 13 when using the large bowl, as shown in Fig. 1. If it now be desired to substitute the small bowl for the large, it is only necessary to remove the right-hand beater, which leaves the central and outside left-hand beaters for operation in the small bowl, the central beater now becoming the inside right-hand beater next to the bowl wall. If the large bowl be replaced, the third beater will again be connected with the inner right-hand drive shaft.

The axes of the drive shafts 15 are so related to the fixed axis of rotation of the bowls, that one beater element always may be placed in substantially the same cooperative relationship with the side walls of the bowl regardless of which bowl is being used, and in each case the beater adjacent the side wall of the bowl reacts on the material being mixed in such a way that it tends to rotate the bowl so as to bring all of the material in the bowl to the beater elements.

The gear reduction unit and its relation to the power unit is described and claimed in my above-mentioned copending divisional application, Serial No. 229,109.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A food-working device comprising a bowl support rotatable on a fixed axis adapted to support each of a plurality of bowls of different diameters for rotation on said axis, a plurality of beater driving shafts rotatable on fixed axes spaced different distances radially with reference to said fixed axis of said bowl support, and a beater element constructed and arranged to be driven selectively by said driving shafts whereby it is positioned adjacent the side wall of each bowl mounted on said support so as to tend to rotate the bowl by its action on the material in the bowl.

2. A food-working device comprising a base, a bowl support mounted on said base for rotation on a fixed vertical axis and adapted to support each of a plurality of bowls of different diameters for rotation on said axis, a power unit, a plurality of beater element driving shafts driven by the power unit mounted for rotation on vertical axes spaced apart in a common plane and having different positions radially with reference to said fixed axis of said bowl support, and a plurality of beater elements constructed and arranged to be selectively operated by said shafts so that one or more of said beater elements can be operated simultaneously in each of said bowls and at least one of said beater elements may be positioned in substantially the same cooperative relationship to the side wall of the bowl irrespective of which of the bowls is mounted on said support.

3. A food-working device comprising a base, a standard on the base, a power unit on said standard overhanging said base, a bowl support under said power unit rotatable on a fixed axis in said base and adapted to support each of a pair of bowls of different diameters for rotation on said axis, three shafts driven by said power unit rotatable on separate axes spaced apart in parallel relation and located at different positions radially with reference to said fixed axis of said bowl support, and three beater elements arranged to be operated by said shafts arranged so that when the large bowl is used all three beater elements may be operated in it and when the small bowl is used only two of the beater elements may be operated in it, the beater shafts being positioned with reference to the fixed axis of said bowl support so that in each case one of said beater elements is positioned adjacent the side wall of the bowl so as to tend to rotate the bowl by its action on the material in the bowl.

ROBERT F. BEAN.

CERTIFICATE OF CORRECTION.

Patent No. 2,192,843. March 5, 1940.

ROBERT F. BEAN.

It is hereby certified that error appears in the printed specification of the above numbered patent requiring correction as follows: Page 1, second column, line 10, for "hoesehold" read --household--; page 2, first column, line 5, for the words "axis of two" read --axes of the--; and that the said Letters Patent should be read with this correction therein that the same may conform to the record of the case in the Patent Office.

Signed and sealed this 7th day of May, A. D. 1940.

(Seal)
                                                Henry Van Arsdale,
                                    Acting Commissioner of Patents.